(12) United States Patent
Lidai et al.

(10) Patent No.: US 10,992,840 B2
(45) Date of Patent: Apr. 27, 2021

(54) OBTAINING PRINTED ELEMENT DATA OF PATCHES TO DETERMINE CALIBRATION DATA OF A PRINTER

(71) Applicant: HP Indigo B.V., Amstelveen (NL)

(72) Inventors: Uri Lidai, Ness Ziona (IL); Rivay Mor, Ness Ziona (IL); Lior Katz, Ness Ziona (IL); Iliya Shahamov, Ness Ziona (IL); Pavel Blinchuk, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 129 days.

(21) Appl. No.: 16/340,834

(22) PCT Filed: Oct. 20, 2016

(86) PCT No.: PCT/EP2016/075223
§ 371 (c)(1),
(2) Date: Apr. 10, 2019

(87) PCT Pub. No.: WO2018/072831
PCT Pub. Date: Apr. 26, 2018

(65) Prior Publication Data
US 2019/0268503 A1 Aug. 29, 2019

(51) Int. Cl.
*H04N 1/60* (2006.01)
*G06F 3/12* (2006.01)
*H04N 1/00* (2006.01)
*H04N 1/40* (2006.01)

(52) U.S. Cl.
CPC ......... *H04N 1/6033* (2013.01); *G06F 3/1211* (2013.01); *G06F 3/1229* (2013.01); *H04N 1/00005* (2013.01); *H04N 1/00087* (2013.01); *H04N 1/40043* (2013.01)

(58) Field of Classification Search
CPC ............ H04N 1/6033; H04N 1/00005; H04N 1/00087; H04N 1/40043; G06F 3/1211; G06F 3/1229
See application file for complete search history.

(56) References Cited

U.S. PATENT DOCUMENTS

| 5,281,979 | A | 1/1994 | Krogstad |
| 6,288,733 | B1 | 9/2001 | Nakazawa et al. |
| 6,750,993 | B1 | 6/2004 | Shirai |
| 7,494,202 | B2 | 2/2009 | Sato |

(Continued)

FOREIGN PATENT DOCUMENTS

| EP | 2635015 A2 | 9/2013 |
| EP | 2693734 A2 | 2/2014 |
| WO | WO-2016091335 A1 | 6/2016 |

OTHER PUBLICATIONS

Shih-Chung, B. L., Performance Characteristics of a Laser Scanner and Laser Printer System for Radiological Imaging, Sep.-Oct. 1986, <http://www.sciencedirect.com/science/article/pii/073048628690003X>.

*Primary Examiner* — Christopher Wait
(74) *Attorney, Agent, or Firm* — Brooks Cameron & Huebsch PLLC

(57) ABSTRACT

An example is provided to calculate calibration data for or print quality data of a printer, in one example, image data on printed elements of a plurality of patches printed at different powers or intensities by a print device may be determined.

15 Claims, 10 Drawing Sheets

| stacked image 1010: sum of frames | frame 1001 | frame 1002 | frame 1003 | frame 1004 |
|---|---|---|---|---|
| 0 0 1 0 | 0 0 1 0 | 0 0 0 0 | 0 0 0 0 | 0 0 0 0 |
| 0 4 4 3 | 0 1 1 0 | 0 1 1 1 | 0 1 1 1 | 0 1 1 1 |
| 0 7 6 0 | 0 1 1 0 | 0 1 1 0 | 0 2 2 0 | 0 3 2 0 |
| 0 0 0 0 | 0 0 0 0 | 0 0 0 0 | 0 0 0 0 | 0 0 0 0 |

(56) References Cited

U.S. PATENT DOCUMENTS

| | | |
|---|---|---|
| 8,130,411 B2 | 3/2012 | Kim |
| 8,390,661 B2 | 3/2013 | Waidman et al. |
| 2008/0218781 A1* | 9/2008 | Kim ..................... B41J 29/393 |
| | | 358/1.9 |
| 2011/0286018 A1* | 11/2011 | Hashizume .......... G03G 15/502 |
| | | 358/1.9 |
| 2013/0229671 A1* | 9/2013 | Yokozawa ........... H04N 1/6033 |
| | | 358/1.9 |

* cited by examiner

Fig. 10

| stacked image 1010: sum of frames | frame 1001 | frame 1002 | frame 1003 | frame 1004 |
|---|---|---|---|---|
| 0 0 1 0 | 0 0 1 0 | 0 0 1 0 | 0 0 1 0 | 0 0 1 0 |
| 0 4 4 3 | 0 1 1 0 | 0 1 1 1 | 0 1 1 1 | 0 1 1 1 |
| 0 7 6 0 | 0 1 1 0 | 0 1 1 0 | 0 2 2 0 | 0 3 3 0 |
| 0 0 0 0 | 0 0 0 0 | 0 0 0 0 | 0 0 0 0 | 0 0 0 0 |

OBTAINING PRINTED ELEMENT DATA OF PATCHES TO DETERMINE CALIBRATION DATA OF A PRINTER

BACKGROUND

Calibration of a printer can result in an increase in the accuracy of print activities. Calibrating a print device may use calibration data, which may be obtained in calibration sessions. In a calibration session, a print of special characters or patches may be performed, and data associated to the printed characters or patches may be acquired and analysed to obtain the calibration data

DESCRIPTION OF THE FIGURES

FIG. 10 shows an operation according to an example.

DETAILED DESCRIPTION

Figure 1:
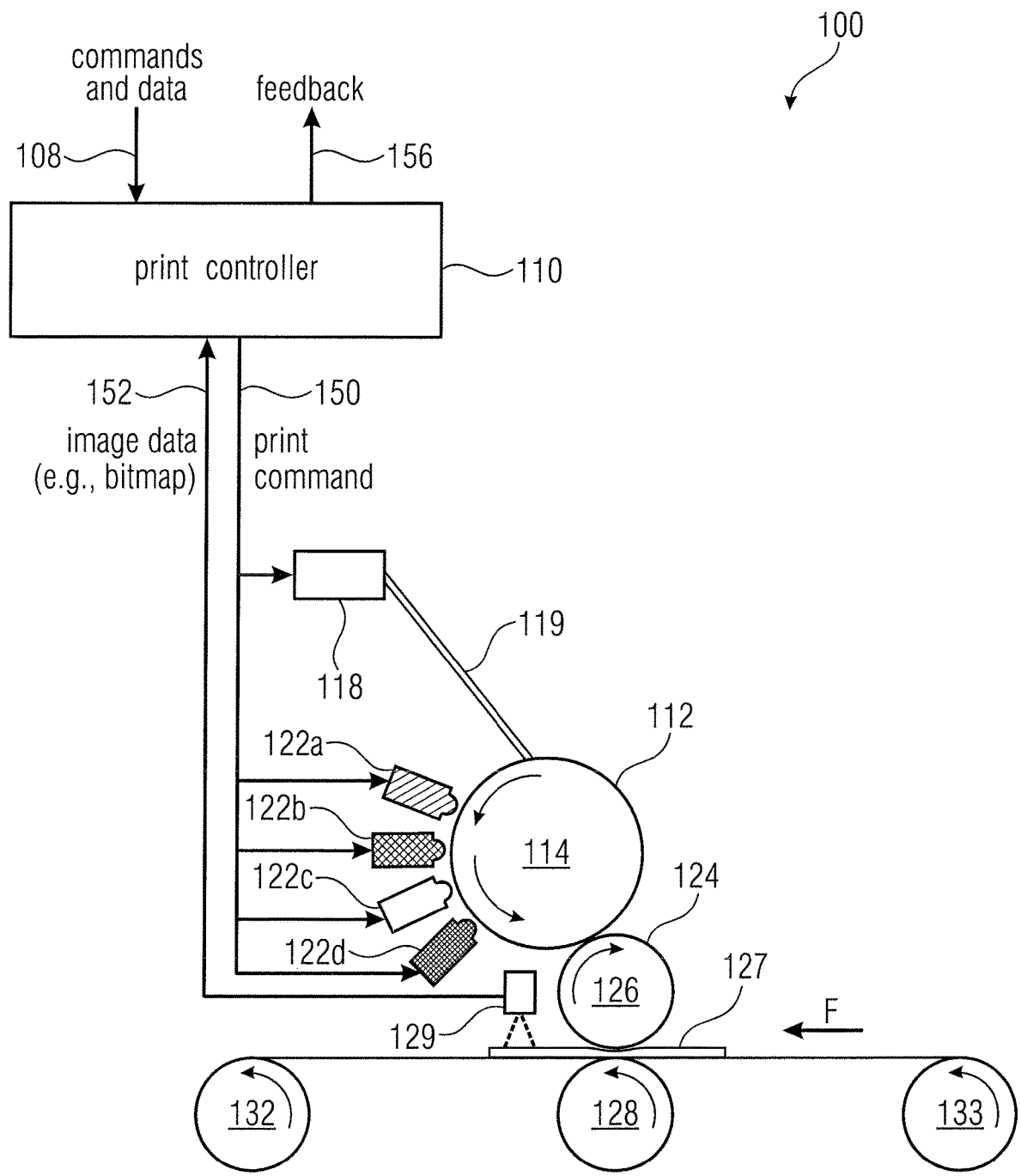
FIG. 1 shows a schematic view of a print system according to an example.

A print device may comprise a multiplicity of components. For example, a print device may also comprise a laser unit which selectively exposes an electrically charged photoreceptor with a laser beam, so as to dissipate charge in some areas. In this manner, a latent image is created on the photoreceptor in the form of an invisible electrostatic charge pattern that replicates the image to be printed. A print device may comprise, for example, a multiplicity of rollers or drums which cooperate to transfer ink from binary ink developers (BIDs) to a substrate, such as paper. Ink provided by the BIDs may be selectively applied to the photoreceptor according to the pattern defined by the latent image.

Calibration data may be obtained by analyzing one patch printed in a calibration session. Some calibration methods are based on iterative procedures. In iterative procedures, a first patch is generated, printed, and subsequently, measured. Optical density may be measured, e.g., using a spectrophotometer which measures the optical density of one single patch. In some examples, spectrophotometer performs measurements on the photoreceptor. Calibration parameters are calculated on the basis of the measurements on the first patch. Using the calibration parameters, a second patch is generated and printed. A second measurement on the second patch is performed, so as to calculate new calibration parameters, and so on.

In general, measurements may be impaired by low frequency variation. Low frequency variation may be due, for example, to a non-perfect cylindrical shape of rollers or drums of the print device, which changes the contact pressure between different rotating elements, hence modifying the transfer of ink in an unwanted manner. For example, if a drum or roller is ovalized, a low frequency variation may be caused, which modifies the ink in the substrate at periodic distances (e.g., the period of the variation may be the half of the circumference of the ovalized roller). Low frequency variation may also be due to the engaging/disengaging mechanisms that move the BIDs to be engaged to or disengaged from the photoreceptor. This process may have implications on the contact pressure between the elements transferring the ink. Low frequency variation may modify, for example, the size of a printed dot in different portions of the substrate.

In iterative methods, patches printed at different iterations may result to be different from each other also for effect of the low frequency variation. Each iteration may inherit a print quality drift due to low frequency variation which has impaired preceding iterations. Therefore, the calibration may be inaccurate. To increase accuracy, iterative methods make use of a great number of iterations, which renders calibration slow.

Further, sensitivity of spectrophotometers is reduced for single dot patterns.

Moreover, spectrophotometers tend to require a considerable amount of time. Movements of drums and rollers of the print device are stopped to permit optical density measurements.

In accordance with the examples described herein, an approach is provided so that multiple patches are printed in a non-iterative print session. As patches are printed on different portions of the substrate, the incidence of the low frequency variation is reduced. Therefore, accuracy is increased. As no multiple iterations are performed, the measurement process is fast.

Moreover, a scanner or an optical sensor which provides an image of the patches is in general fast. When using a scanner, an image may be acquired while the substrate is moving along a feed direction.

A scanner or an optical sensor which provides an image of the patches permits to achieve accurate images. Geometrical features of printed elements may be directly measured. For example, the diameter of printed dots may be obtained. A dot diameter may be calibrated with high precision, which increases the quality of print jobs.

By measuring geometrical data of printed elements, such as dots, directly on the substrate, the calibration and/or the print quality verifications obtained by using measurements performed on the substrate are extremely reliable: it is possible to obtain a calibration which keeps in account, for example, the pressure between the photoreceptor and the substrate, or any phenomenon occurring in intermediate elements between the photoreceptor and the substrate.

Hereinafter, examples are mainly directed to printing systems and methods, e.g., using laser printers, print presses, ink-jet printers, liquid toner electrophotographic printers (LEPs), etc.

FIG. 1 shows an example of print system 100, which may comprise a digital offset press or a LEP. The print system 100 may comprise a print controller 110. The print controller 110 may manage the print of images. The print controller 110 may receive commands and data 108 from a user, e.g., through a typographical application. The user may also be remote, e.g., connected thorough a geographical network. The print controller 110 may output feedback 156.

The print system 100 may include a photo imaging component, such as a photoreceptor (image plate) 112, which may be mounted on a photoreceptor/imaging drum/cylinder 114. The photoreceptor 112 may define an outer surface of the imaging drum 114 on which images are formed. A laser unit (writing head) 118 may selectively expose the photoreceptor 112 with a laser beam 119, in particular exposing image areas on the photoreceptor 112 and dissipating (neutralizing) the charge in some areas. Exposure of the photoreceptor 112 in this manner creates a latent image in the form of an invisible electrostatic charge pattern that replicates the image to be printed. The laser unit 118 may modify the intensity of the laser beam 119, e.g., for obtaining different grey scales, on the basis of a reference power level input by the print controller 110. The intensity of the laser beam may be an average intensity. The print unit may define the intensity of the laser beam e.g., using a pulse-width modulation (PWM) technique. Accordingly, the average value of the power intensity is controlled by switching on and off the generation of the laser beam at a fast rate. The longer the on period compared to the off period, the higher the average power of the laser beam.

After the latent electrostatic image is formed on the photoreceptor 112, the image may be developed by binary ink developers (BIDs) 122a, 122b, 122c, and 122d, to form an ink image on the outer surface of the photoreceptor 112. Each BID may comprise a developer roller which rotates against the imaging drum 114 to develop one ink color on the photoreceptor 112. Each BID may be selectively engaged to/disengaged from the photoreceptor 112 for developing each color. Each developed color may correspond with one image impression or color separation. While four BIDs are shown, indicating a four color process, other implementations may include a different number of BIDs.

According to an example, in a first image transfer, a single color separation impression of the ink image developed on the photoreceptor 112 may be transferred from the photoreceptor 112 to an image transfer blanket 124. The image transfer blanket 124 may be wrapped around and securely fastened to the outer surface of an intermediate transfer member (ITM) drum 126. The first image transfer that transfers ink from the photoreceptor 112 to the print blanket 124 is driven by an applied mechanical pressure between the imaging drum 114 and the ITM drum 126, and electrophoresis of the electrically charged ink particles.

The print blanket 124 may be heated, e.g., under the control of the print controller 110. The heated print blanket 124 may cause most of the carrier liquid and solvents in the transferred ink image to evaporate. The heated blanket 124 may also cause particles in the ink to partially melt and blend together. This results in a finished ink image on the blanket 124 in the form of a hot, nearly dry, tacky plastic ink film.

In a second image transfer, the hot ink film image impression may be transferred from the blanket 124 to a substrate 127 such as a sheet of print media (e.g., paper). The substrate 127 may be held or supported by an impression (IMP) drum/cylinder 128. Contact pressure between the ITM drum 126 and IMP drum 128 may compress the blanket 124 against the substrate 127 to facilitate the transfer of the hot ink film image.

The substrate 127 may be fed in the direction of the length of the substrate 127, which may be along a feeding direction (print direction) F. In FIG. 1, a left portion of the substrate 127 is printed before a right portion. Rollers 132 and 133 and/or the IMP drum 128 may be used for feeding. Motor units, which may be controlled by the print controller 110, may be used to drive the movements.

In some implementations, an intermediate transfer member may be avoided, and ink is directly transferred from the photoreceptor 112 to the substrate.

The print system 100 may comprise an optical sensor (image sensor) 129 which may be an optical reader or scanner. The optical sensor 129 may be placed downstream to the transfer of ink performed on the substrate 127. The optical sensor 129 may acquire optical data printed on the substrate 127. The optical sensor 129 may create at least one image or provide the data for creating an image, for example, by outputting data to the print controller 110. The acquired image may be a matrix formed by a plurality of pixels, for example, and may also be compressed and/or encrypted. The acquired image may have a standard format, such as bitmap, GIF, JPG, PDF, and so on. The acquired image may be monochromatic. Each pixel of the acquired image may have an intensity values (e.g., grey scale). The optical sensor 129 may have a resolution which is greater than the resolution of the printer. In one example, the optical sensor 129 may have a resolution of 600 dots per inch (DPI).

In operation, calibration may imply controlling the laser power of the laser unit 118 or the intensity of the laser beam 119 generated by the laser unit 118. By modifying the laser power (e.g., according to the calibration data), the optical intensity of laser beam 119 may also be modified, for example by modifying the PWM values input to the laser unit 118. Accordingly, the latent image in the photoreceptor 112, as a result of the electric charge selectively dissipated by the laser beam 119, may also be modified. Consequently, the amount of toner applied to the photoreceptor is also modified, and so is the intensity of the inks applied on the substrate 127 in the final image.

The print controller 110 may transmit a print command 150 to perform a print session for calibration, e.g., by controlling the BIDs 122a-122d, the laser unit 118, and the motor units, to perform a print of the patches. The print session may comprise printing an image containing at least two different patches. The at least two different patches may be printed, for example, using different intensities. The different intensities may be obtained by using different optical intensities for the laser beam 119, for example.

The print controller 110 may obtain image data 152 acquired by the optical sensor 129. The optical sensor 129 may acquire an image of the patches printed on the substrate 127 in the print session. The image data 152 may contain the image data of the two different patches printed on the substrate 127.

By measuring the image data, e.g., by comparing the image data on the patches with standard values and/or expected values, it is possible to obtain information on the print quality of the printer and/or obtaining calibration data. The print quality data may be provided to a user as feedback 156.

By calibrating the laser unit 118, print jobs which are more respondent to the intended result may be produced. Calibration may permit, for example, to avoid precision drifts that may impair, especially, old printers. In particular it is possible to calibrate the laser unit 118 on the basis of the feedback provided by the optical sensor 129.

As multiple patches are positioned in different portions of the substrate 127, the effect of the low frequency variation may be reduced, and the accuracy of the obtained calibration data and/or print quality data may be increased. As the patches are generated in one non-iterative session, data corruption due to an accidental imperfection occurred in one single iteration may not arise. By collecting image data from several patches, statistical computations (e.g., based on a regression method, a linear regression method) may permit to overcome drifts impairing single patches.

As the optical sensor 129 provides an image of the substrate 127, the calibration data and/or print quality data also take into account the physical phenomena occurring downstream to the photoreceptor. Imperfections in the shape of the ITM 126, for example, may be accurately taken into account.

As the optical sensor 129 may provide image data (such as a bitmap) of the printed patches, the data acquisition is fast and accurate. The image data may be stored as a file associated to a matrix of pixel or a compressed version of a matrix. Calibration data and/or print quality data may therefore be derived in a subsequent session, which does not require further prints.

Figure 2A:
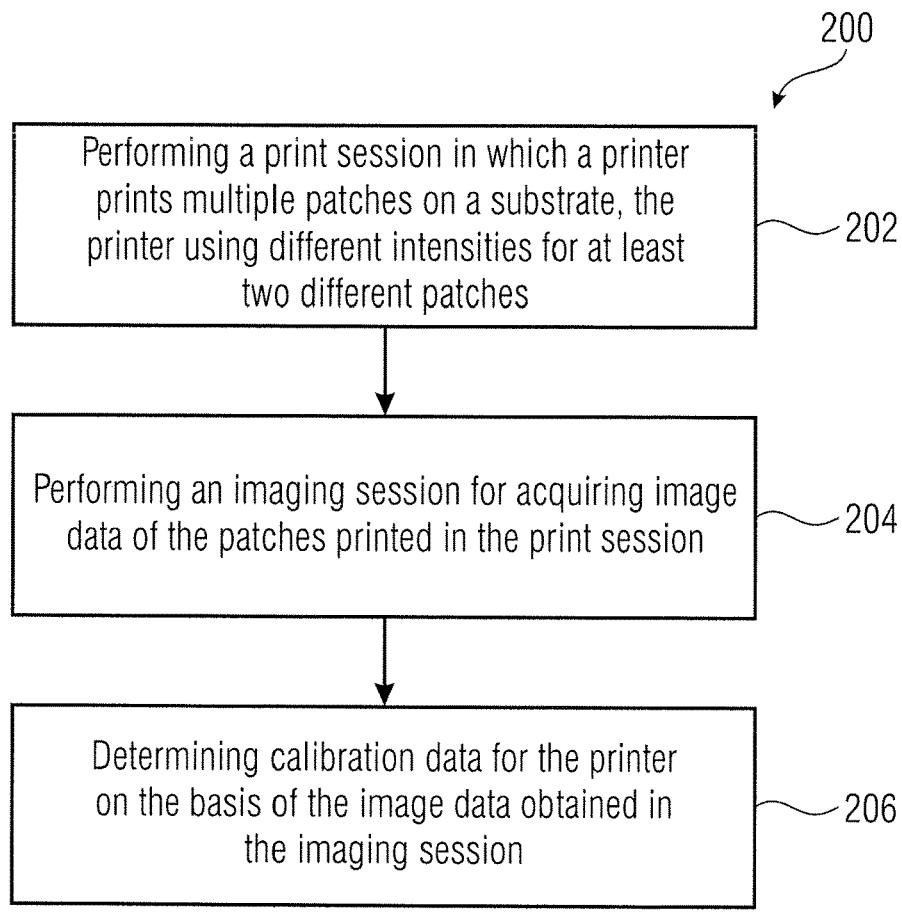
FIGS. 2a and 2b show methods according to examples.

FIG. 2a shows a method 200 for determining calibration data. The method 200 may be controlled by the print controller 110, for example. The method 200 may be non-iterative.

At block 202, a print session is performed. A plurality of patches may be printed on substrate 127. Multiple patches may have been obtained by using different inks (e.g., different colorants), e.g., developed by different BIDs. Patches of different colors may be arranged in different positions. In the same print session performed at block 202, the laser unit 118 may use different powers (e.g., laser powers) for at least two different patches. Where patches with different colors are printed, the laser unit 118 may use different laser powers for at least two different patches printed with the same ink.

In some examples, all the parameters (e.g., ink, power levels, etc.) to perform the print session may be determined a priori. No data from sensors of the print system 100 may be used. The print session may be unique in the method 200.

In some examples, patches of the same color and intensity may be repeated in different portions of the substrate. Repeated patches may be placed at a mutual distance which is random. Repeated patches may be placed at a mutual distance so that the distance between corresponding printed elements of the repeated patches is different from the period of the low frequency variation or an harmonic of the low frequency variation. Repeated patches may be placed at a mutual distance which keeps in account the engaging/disengaging mechanism for permitting the contact between the BIDs 122a-122d and the photoreceptor 112. Repeated patches may be placed at a mutual distance which has a relationship with structural features of the print system 100. For example, corresponding printed elements of redundant patches may be placed at distances which are different from the circumference, the half circumference, or a multiple or submultiple of the circumference or the half circumference of the drums or rollers, such as at least one of the developer rollers of the BIDs, the imaging drum 114, the ITM 126, or the IMP 128. Accordingly, even if one drum or roller is not perfectly cylindrical (e.g., slightly ovalized), repeated patches are generated at positions which imply different contact pressures between the non-perfectly cylindrical drum or roller and the other elements of the print system 100. Therefore, impairments of the low frequency variation may be reduced.

At block 204, an imaging session may be performed, e.g., using the optical sensor 129, for acquiring image data of the patches previously printed in the print session. In some examples, the imaging session may start while the print session is still occurring. Previously printed patches may be imaged by the sensor 129, while subsequently printed patches are still being generated.

In some examples, the imaging session may be unique in the method 200. In some examples, once the imaging session is ended, a new print session for printing patches for the calibration is not started.

Image data may be processed at block 206 to define calibration data, e.g., for the laser power. It is possible to measure geometrical data on the image data obtained from the patches. Geometrical data may comprise at least one of largess, height, eccentricity, roughness, or diameter of a printed element, such as a printed dot. Geometrical data obtained from the image data acquired from the printed patches may be compared with expected data pre-stored in a memory. Calibration data may be determined on the basis of the geometrical data. Calibration data may be determined on the basis of image data associated to intensities of image pixels. For example, the average intensity (e.g., grey level) of pixels associated to a printed element may be calculated. Calibration data may be stored in a memory and used during the operations of the print system.

Calibration data may contain, for example, offset power values, so that, in operation, the print controller may add or subtract the offset values from intensity values of pixels of an image to be printed. Calibration data may contain, for example, scaling factors which may be multiplied to intensity values of pixels of an image to be printed.

Calibration data may be stored, for example, in a memory. A look-up table may be defined. For example, for each reference value or range of reference values, a particular memory location may contain a modified calibrated value, which, for example, may be applied to the laser unit 218. A memory unit may also contain offset values to be added or scaling factors to be multiplied to reference intensity values (e.g., intensity values to be input to the laser unit 218).

Figure 2B:
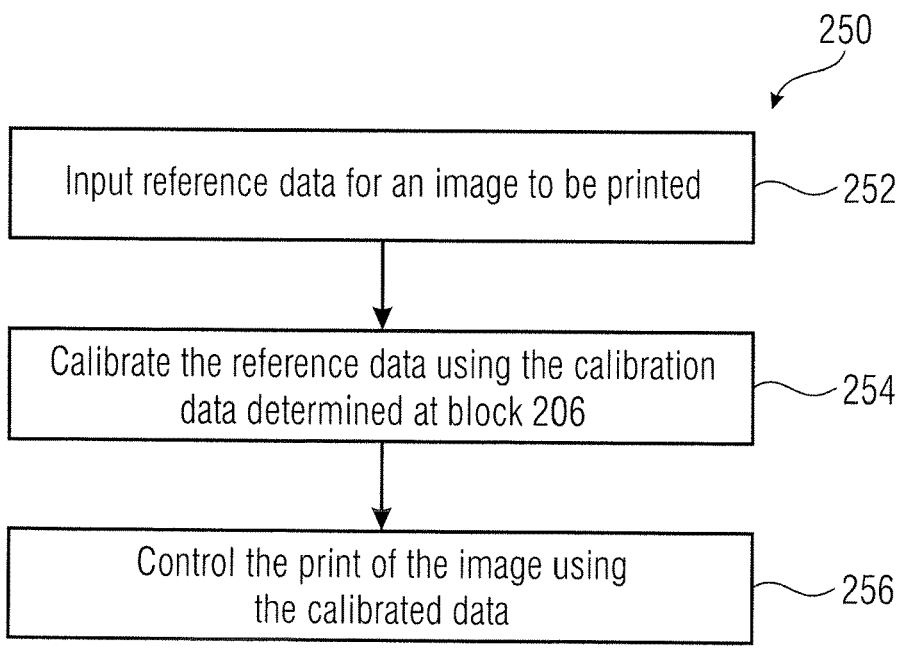

FIG. 2b shows a method 250. Using the method 250, it is possible to print an image using the calibrated data obtained with method 200.

At block 252, reference data may be input for an image to be printed. The reference data may have the format of a bitmap, for example. The reference data may be independent from the state of the printer. In some examples, the reference data do not contain information associated to the calibration of the specific printer.

At block 254, calibrated data may be obtained by calibrating the reference data using the calibration data determined at block 206 of method 200. For example, power level values to be output to the laser unit 218 may be modified according to the calibration data. For example, when the method 200 has detected that the average diameter of dots of the patches is larger than an expected threshold, at block 254 a scaling factor may be applied to the reference data, for example by scaling the power level values to be used by the laser unit 218.

At block 256, the input image is printed using the calibrated data. For example, the intensity of the laser beam 219 may be adapted to the particular print system by modifying the input reference data using the calibration data determine with method 200.

Figure 3:
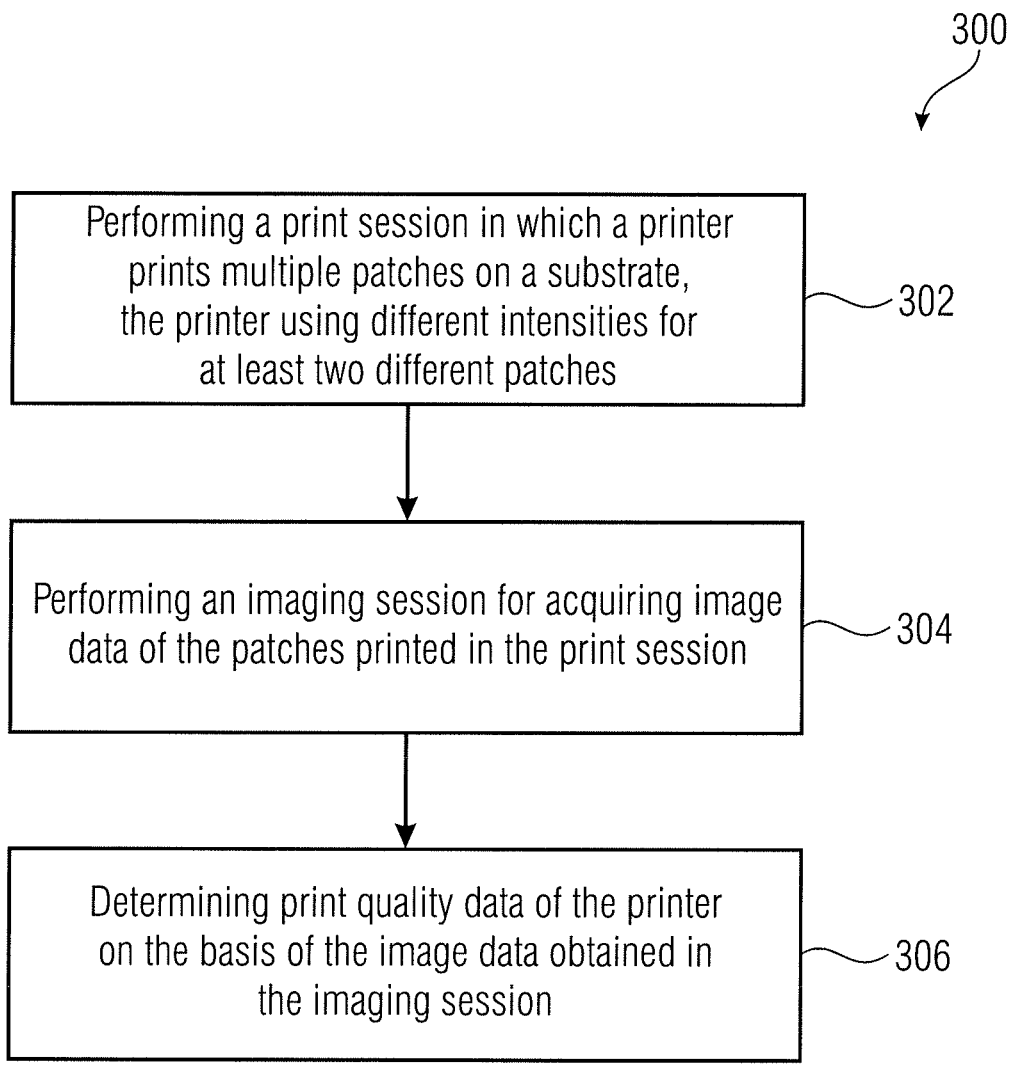
FIG. 3 shows a method according to an example.

FIG. 3 shows a method 300. With method 300, it is possible to obtain quality data and to perform a verification of the print system. The method 300 may be non-iterative.

Block 302 may be analogous to block 202 of method 200. A print session may be performed, in which at least two patches are printed at different powers or intensities.

Block 304 may be analogous to block 204 of method 200. An imaging session may be performed, in which an image with the at least two patches is acquired.

Image data obtained at block 304 may be processed at block 306 to define quality data or verification data of the laser power. It is possible to measure geometrical data of printed elements obtained from the image data acquired from the patches and compare the geometrical data with standard data pre-stored in a memory. Geometrical data may comprise at least one of largess, height, eccentricity, roughness, or diameter of a printed element, such as a printed dot. Geometrical data obtained from the image data acquired from the patches printed may be compared with expected data pre-stored in a memory. Print quality data may be determined on the basis of the geometrical data. Print quality data may be determined on the basis of image data associated to intensities of image pixels. For example, the average intensity (e.g., grey level) of pixels associated to a printed element may be calculated. On the basis of the print quality data, it is possible to verify if the print device is according to a particular quality standard.

Accordingly, at block 306 the quality of the print may be determined. It is possible to determine a quality class (e.g., "good quality", "acceptable quality", "unacceptable quality") of the print device in relationship to the print quality data.

A method according to an example is based on performing the method 200 for calibrating a printer before performing the method 300. Accordingly, it is possible to perform a first print session at block 202, a first imaging session at block 204, a determination of calibration data at block 206, a second print session at block 302 in which patches are printed using calibrated data, a second imaging session at block 304, and a determination of print quality data at block 306. Accordingly, it is possible to verify the quality of the calibration.

Figure 4A:
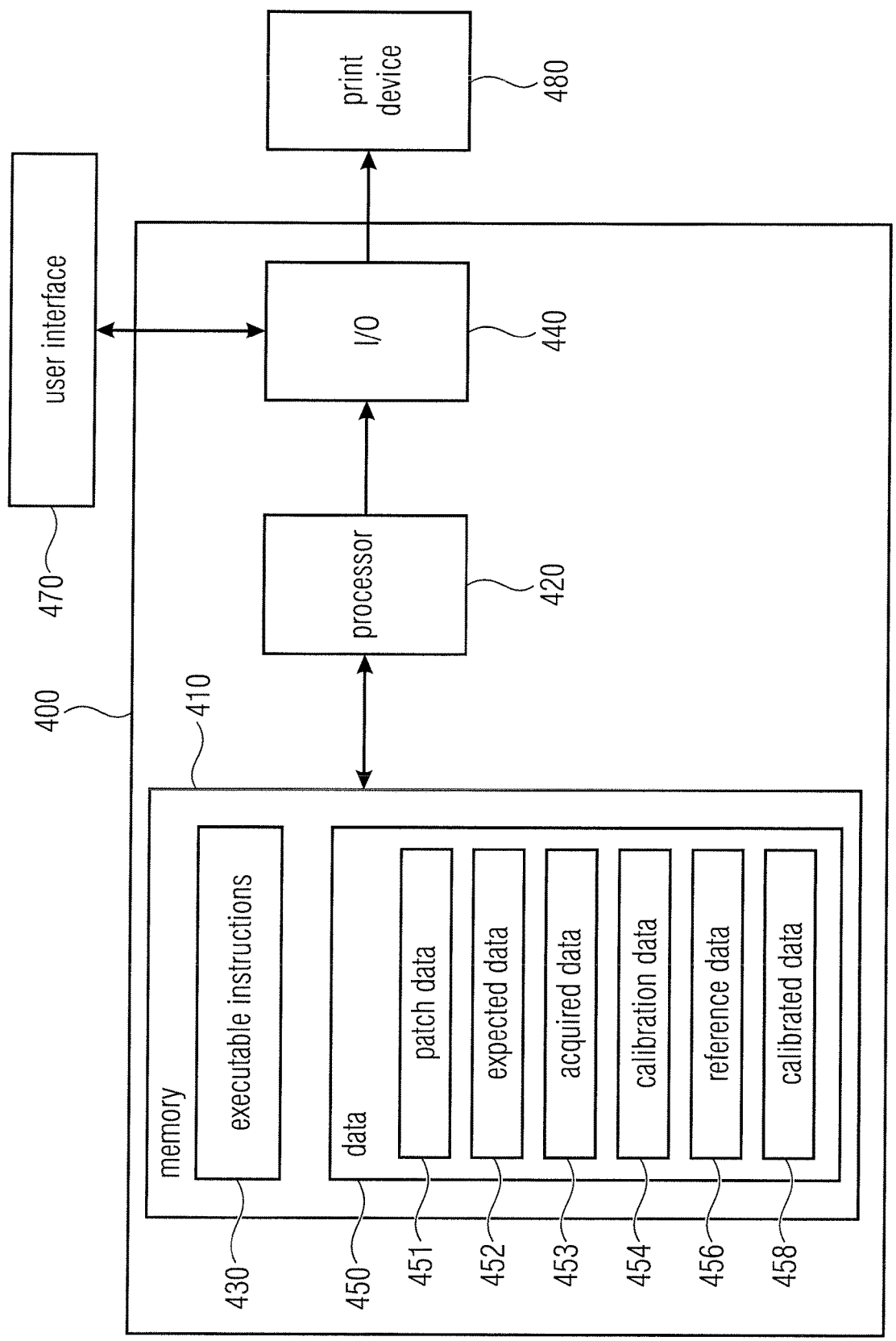
FIGS. 4a and 4b show computer systems according to examples.

FIG. 4a shows a system 400 which may be an example of the system controller 110. The system 400 may comprise a processor 420 and a memory 410 which contains executable instructions 430 which, when executed by the processor 420, cause the processor to perform at least one of the calibration session and a calibrated print of an input image. The processor 420 may be connected, e.g., through an I/O device 440, to a user interface 470 and/or to a print device 480.

The memory 410 may contain a data space 450 with data for the processor 420. The data space 450 may store patch data 451 for defining the features of at least two different patches to be printed at different intensities. The patch data 451 may include data such as data associated to the different power levels used, in method 200, for performing the print session, the different inks to be used, and so on. The patch data 451 may comprise geometrical data of the patches. For example, the data regarding the patches may include dimensions of the patches, shapes, and so on. The patch data 451 may comprise positional data of the patches. The positional data of the patches may include the relative positions of the patches, e.g., in relation to different inks, power levels, and so on. In one example, the patch data 451 may be stored in a read-only memory portion of the data space 450, for example.

The data space 450 may store expected data 452. For example, expected data include an expected relationship between geometrical dimensions of printed elements of the data (e.g., the dimensions of dots) with intensity values (e.g., intensity level values used by the laser unit 218). In one example, the expected data 452 may be stored in a read-only memory portion of the data space 450, for example.

The data space 450 may store acquired data 453. For example, the acquired data may be acquired by the optical sensor 127. The acquired data 453 may be, for example, image data expressed as matrices of pixel, for example bitmaps.

The data space 450 may store calibration data 454. The calibration data 454 may be determined, for example, when the executable instructions 430 cause the processor 420 to perform the method 200.

The data space 450 may store reference data 456. The reference data 456 may be input by a user through the user interface 470, for example. The reference data 456 may be independent from the calibration data 454.

The data space 450 may store calibrated data 458. Calibrated data 458 may be obtained, for example, when the executable instructions 430 cause the processor 420 to perform the method 250. The calibrated data 458 may include power level values to be provided to the laser unit 118, e.g., as PWM data.

Figure 4B:
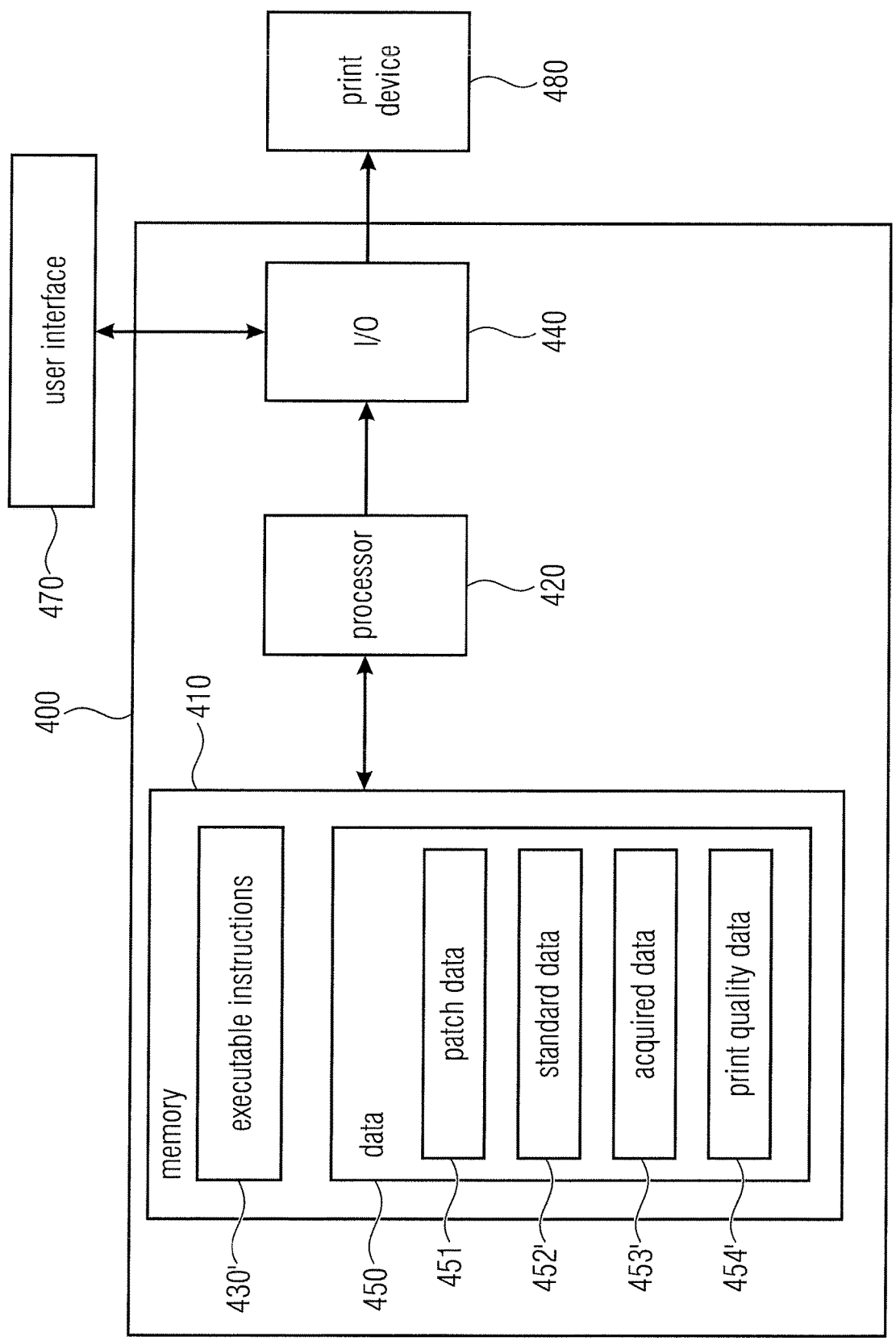

FIG. 4b shows the system 400 which, in memory 410, contains executable instructions 430' which, when executed by the processor 420, cause the processor 420 to perform a print quality determination operation.

The data space 450 may store patch data 451 which are data relating to the patches to be printed. The patch data 451 may be the same as the patch data 451 of FIG. 4a.

The data space 450 may store standard data 452' which may be geometrical data (e.g., measurement data on geometrical sizes of printed elements of the patches) which are expected when the print device operates with satisfactory quality. In some examples, the standard data 452' may be the same of the expected data 452 of FIG. 4a.

The data space 450 may store acquired data 453' which may be acquired by the optical sensor 127. The acquired data 453' may be, for example, image data expressed as matrices of pixel, for example bitmaps.

The data space 450 may store verification data and/or print quality data 454' which may be obtained when the executable instructions 430' cause the processor 420 to execute the method 300. The verification data and/or print quality data 454' may be notified to a user via the user interface 470.

Figure 5:
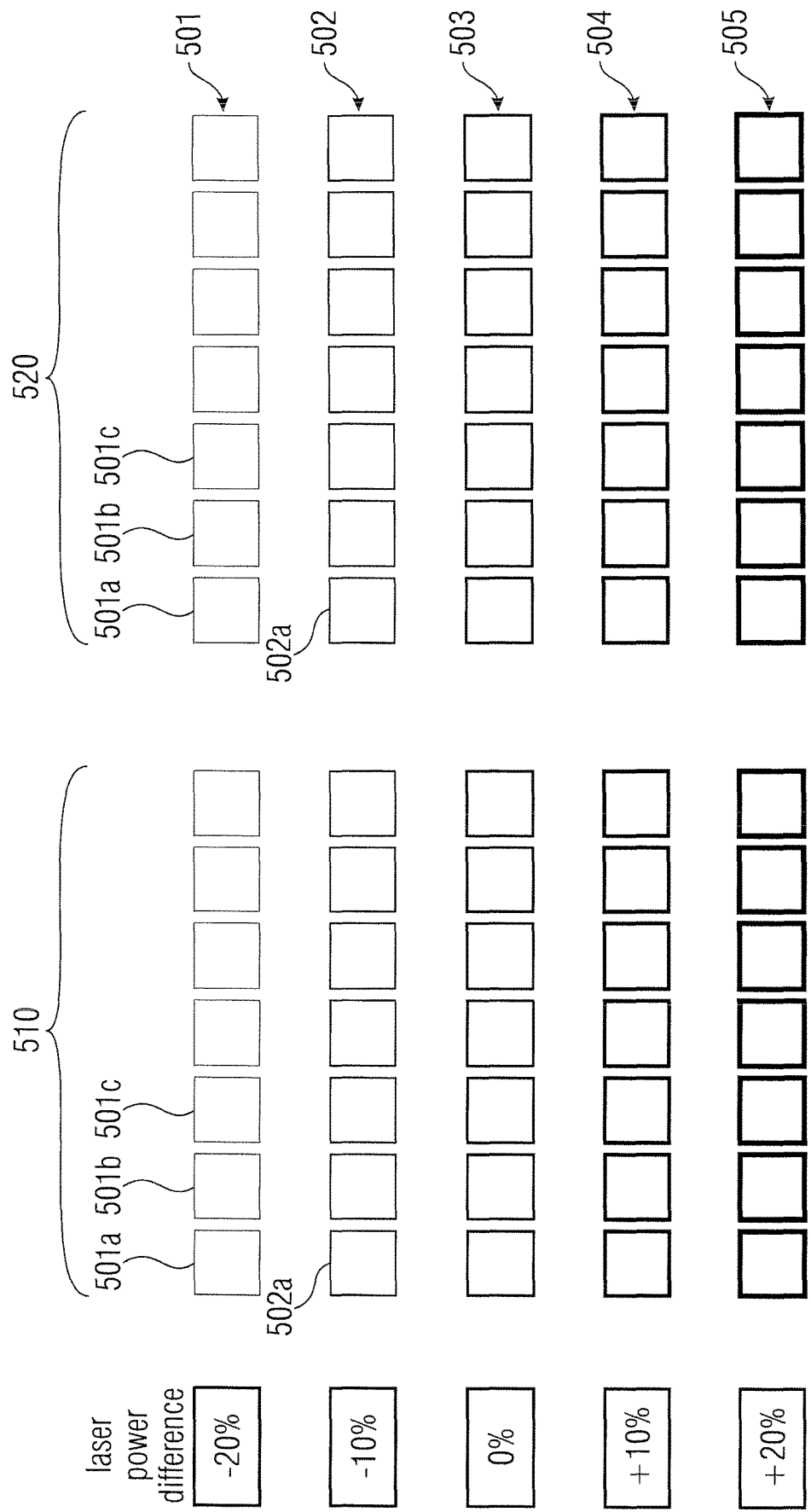
FIG. 5 shows a print view according to an example.

FIG. 5 shows patches printed on a substrate during a print session, e.g., at block 202 of method 200 or block 302 of method 300. Patches may be displaced in positions associated to their intensities. Patches may be grouped by intensities (in FIG. 5, patches of same laser intensities are grouped in the same rows 501-505). Patches obtained with the same ink and the same intensity may be repeated, e.g., to increase redundancy (in FIG. 5, redundant patches are repeated in different columns 510, 520). Patches may be displaced in positions associated to the specific BIDs. In FIG. 5, a first patch 501a, printed with a first ink, precedes a second patch 501b, printed with a second ink. The second patch 501b precedes a third patch 501c, printed with a third ink, and so on. Patch 501a is redundant both in column 510 and in column 520: both these instances of the same patch 501a have been printed with the same intensity and the same ink (colorant). The distance between the patches (and in particular between two redundant instances of a patch) may be chosen so as to be different from the periodicity, a multiple or a submultiple of the periodicity of the low frequency variation. The same applies to patches 502b and 502b. In this example, column 520 repeats all the patches of column 510. The patches 502a in row 502 has the same ink of patch 501a, but the patch 502a has been printed using a different power intensity (in FIG. 5, power intensities are indicated by percentage differences from a particular power intensity).

Figure 6:
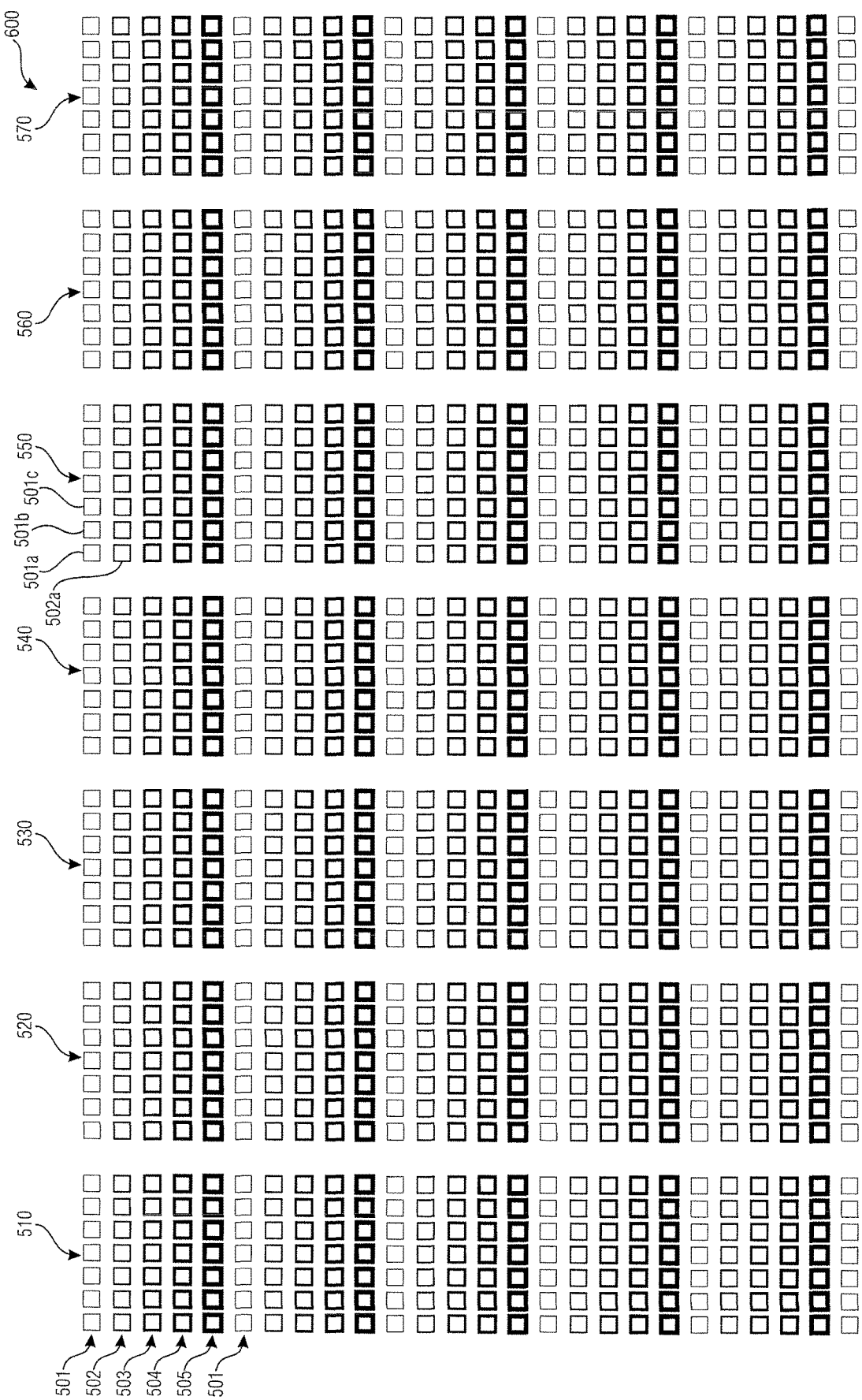
FIG. 6 shows a print view according to an example.

FIG. 6 shows an image 600 which may be printed in the print session 202 or 302, for example. The print image 600 may have a layout with 5~10 columns 510-570 (here, 7 columns), each column repeating the same patches, and 20~30 rows (here, 26 rows), each line having patches obtained at a particular intensity. The rows may be repeated, e.g., by repeating patches obtained at 80%, 90%, 100%, 110%, and 120% power with respect to a particular value. The rows 501-505 may therefore be repeated, e.g., the sixth row may be the same as the first row 501. Each of columns 510-570 is here subdivided into seven sub-columns, each of them printed with one single ink (e.g., a first ink for the sub-column containing patch 501a in FIG. 6; a second ink for the sub-column containing patch 501b; and so on).

When the print session, e.g., at block 202 or 302, has started, the positions, inks, and power values of the patches are already determined.

A patch may comprise at least one printed element, such as a dot, a line, or a cluster of dots.

A patch may have a linear shape. The linear shape may comprise a line. A patch may be made of a number of 3, 4, or 5 lines, for example. At least one line may be divided into print pixels or dots. At least one line may be horizontal (e.g., perpendicular to the print direction F). At least one line may be vertical, (e.g., parallel to the print direction F). A patch may be formed by a group of lines forming a rectangle, e.g., a square. A patch may have a hollow figure. A void area may be present between the lines forming the patch. A line may be formed by a collection of adjacent pixels or dots, printed consecutively.

A grid pattern for a patch may be defined so as to include less of the 5%, in particular the 1%, of the printable space on a printable area. For example, a patch may comprise a single printed line every 10 printable lines.

A patch may comprise a cluster of printed elements, such as dots. A cluster may comprise at least two of these printed elements which are spatially displaced from each other so that void spaces are placed between the at least two printed elements. Distances between different printed elements may be determined a priori.

Figure 7:
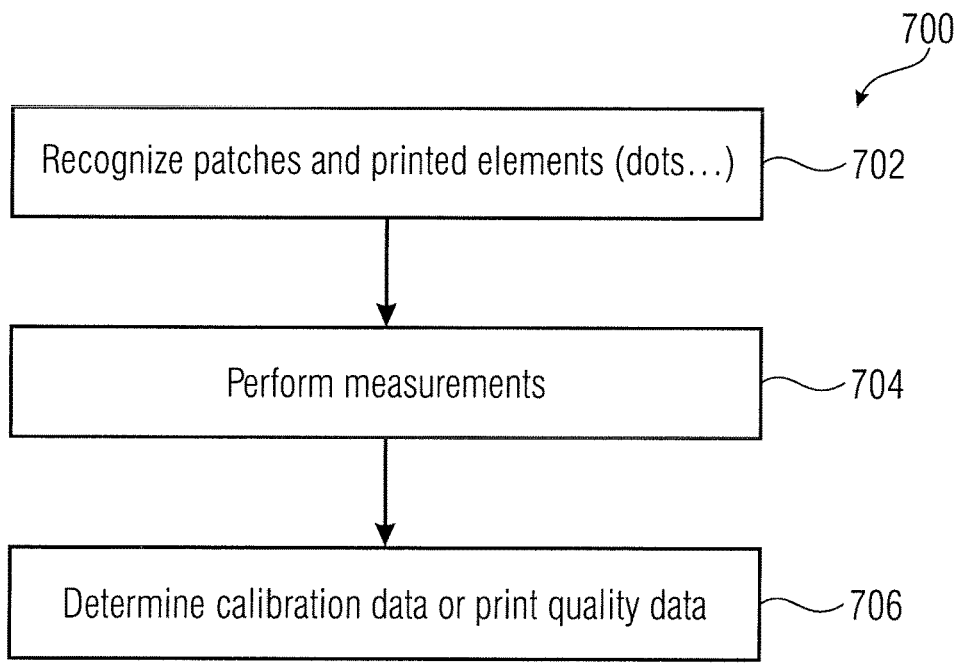
FIG. 7 shows a method according to an example.

FIG. 7 shows a method 700 which may be, for example, implemented at block 206 or 306. When the image data have been provided by the optical sensor 129, a patch recognition is performed at block 702. The shape of the patches may be recognized, e.g., by the optical sensor 129 or by a logic unit input by the image data provided by the image sensor 129, e.g., by the controller 110. The logic unit may, therefore, recognize each patch. The patch recognition may be performed, for example, by deriving positional data, e.g., by virtue of the position of a patch in relationship to the positions of the other patches, e.g., by acknowledging whether a patch is part of one of the rows 501-505, or one of the columns 510-570, and by acknowledging which is the ink that has been used, e.g., by counting the patches in the same column and row. The patch recognition may comprise detecting the color of each patch, so as to calculate different calibration data for different colorants.

The printed elements (such as dots, clusters, etc.) forming the patches may be identified. The dots or the clusters which have been printed may be recognized one-by-one. The dots may be identified, for example, by retrieving areas with pixels or groups of pixels having an intensity greater than a minimum threshold. The dots may be identified, for example, by calculating a ratio of the intensity value (grey level) of each pixel over the average or median intensity value or maximal intensity value of the neighbour pixels, and by comparing the ratios obtained for all the pixels. Dot identification may also use a morphological filter or be based on Hough transforms.

At block 704, measurements may be performed on printed elements of the patches. For example, special patterns in the patches, lines, dots and/or dot clusters may be analysed. These analyses may be performed on the image data (e.g., bitmap) which have been provided at block 204.

The measurements may comprise geometrical measurements on the printed elements of the patches. Geometrical measurements may be based on aggregate data or statistical data of the printed elements (e.g., dots, clusters, lines, etc.) of the patches. Images of different printed elements may be processed and/or combined together for permitting calculations on aggregate or statistical data. Geometrical measurements may comprise the determination of geometrical magnitudes of printed elements or combined printed elements, such as an area of a dot, a diameter of a dot, the vertical or horizontal length of a dot, the area or the perimeter of a polygon constructed on dots of a cluster distances between elements of a cluster, such as distances between dots, etc.

The measurements may take into account intensity values of the pixels of the acquired image. For example, a value of a pixel of an image acquired by the optical sensor 129 (or an image as composed with by a multiplicity of images) may be an intensity value. A size of a dot may be calculated, for example, as an area of pixels having an intensity, e.g., grey scale, greater than a minimum threshold.

At block 706, calibration data and/or print quality data may be determined on the basis of the measurements performed at block 704. Measured data may be compared to expected data or standard data stored in a memory. Calibration data may be derived by comparing the measured data with expected data, for example. For example, when the measured diameters of the dots are larger than expected, the calibration data may be determined so as to reduce the power values provided to the laser unit 218. Quality data or verification data may be derived by comparing the measured data with standard data. For example, when the measured diameters of the dots are larger than the maximum which is pre-established for dots, the quality or verification data are determined so as to determine (and, in case, notify to a user) that the printer lacks a minimum standard quality or is in an inferior or non-acceptable quality class.

Figure 8:
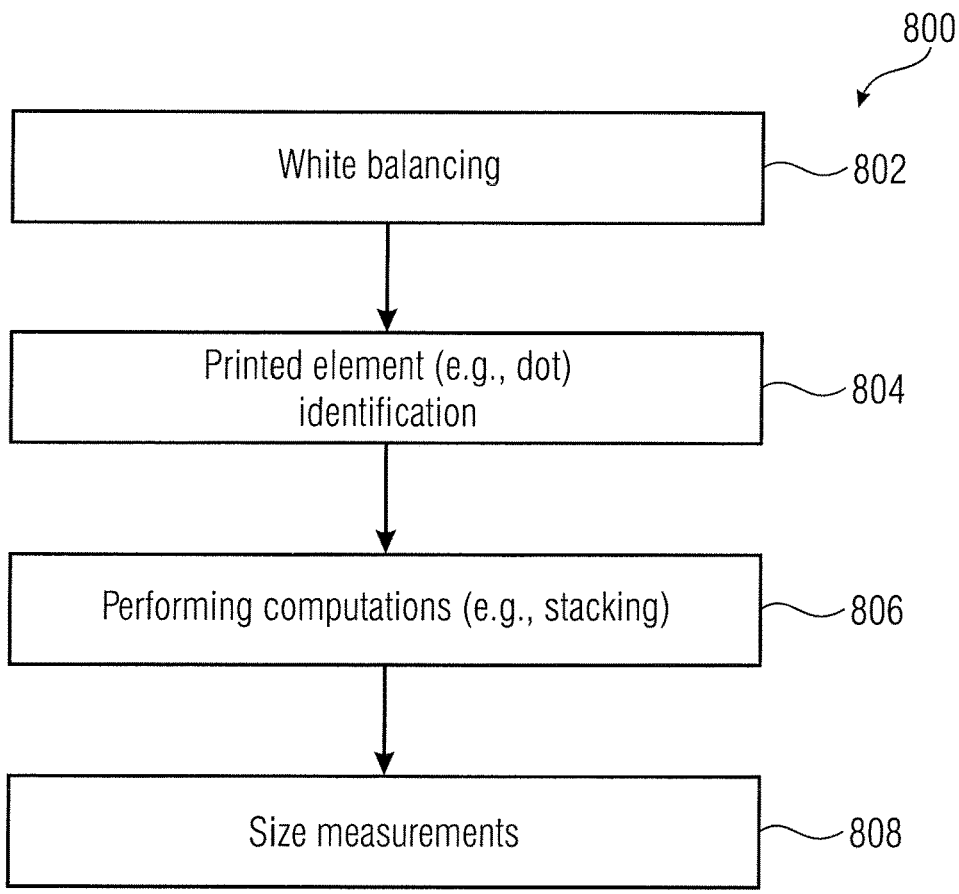
FIG. 8 shows a method according to an example.

FIG. 8 shows a method 800 which may be used for performing measurements on printed elements (dot, clusters, lines, etc.), e.g., at block 704 of method 700.

At block 802, white balancing may be performed to an image of the patches. Accordingly, high frequency light variations may be filtered.

Figure 9:
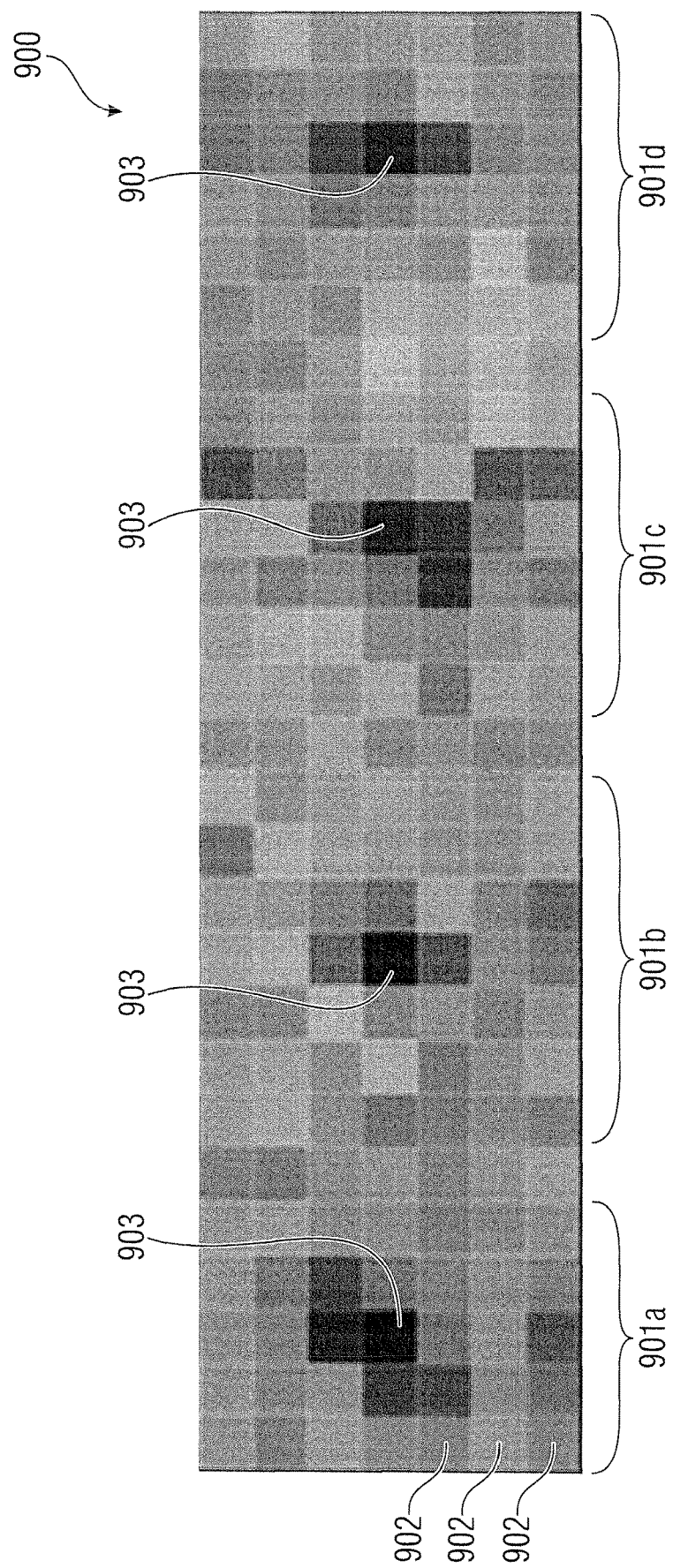
FIG. 9 shows a print view according to an example.

At block 804, each printed element (e.g., dot) of the patch may be identified. Each dot of the patch may be represented, in the image acquired by the optical sensor 129, by a plurality of pixels. FIG. 9 shows an image, formed by a plurality of pixels 902, in which four dots have been recognized in areas 901a, 901b, 901c, and 901d.

At block 804, dots may be identified, for example, by determining a mass center 903. A mass center may be a pixel which approximates an average point of the distribution of the intensity within a particular area. A mass center may correspond to a pixel with greatest intensity in the image 900 in the same pixel area.

At block 806, calculations may be performed on printed elements. For example, averages or other computations on statistical or aggregate data of different printed elements may be performed. Accordingly, white noise may be averaged out. The printed elements may refer to dots or clusters of the same patch or dots or clusters of patches made with the same laser intensity and with the same ink.

At block 806, multiple dots may be stacked to each other. A stacking procedure may be illustrated with reference to FIG. 10. Each of frames 1001, 1002, 1003, and 1004 relates to one identified dot and is formed by the pixel corresponding to the mass center of the dot and a plurality of pixels around the mass center. In FIG. 10, each frame is represented as a matrix (e.g., a 4×4 matrix), the numerical value of each pixel indicating an intensity level. Each frame may be a matrix of pixels acquired by the optical sensor 129, e.g., after white balance.

At block 806, a stacked frame 1010 may be the result of a pixel-by-pixel sum between pixels at the same positions in the of the frames 1001-1004. In some examples, an average may be calculated. In some examples, the stacked frame 1010 may be processed to be normalized, for example. For example, in FIG. 1010, all entries of the stacked frame 1010 may be divided by the maximum value (in this case, 7). Each pixel value of the stacked frame 1010 may be averaged, e.g., by dividing its intensity value by the number of frames (in this case, 4) which have been amended to each other. The stacking procedure may be performed on dots taken from the same patch or on dots taken from different patches of the same ink and/or intensity. With reference to FIG. 5, pixels of all the instances of patch 501*a*, for example, may be stacked to each other. The same may apply for the other patches.

At block 808 of method 800, the size of a printed element (e.g., the size of the stacked frame 1010, or the averaged or normalized version thereof) may be calculated.

In particular when measuring the size of a dot, it is possible to refer to a dot's diameter. A dot diameter may be obtained for the stacked frame 1010 or the averaged or normalized version thereof. For example, a diameter may be calculated by averaging the distance of each pixel by using the pixel value as a weight. For example, in the stacked frame 1010, the pixel with value 6 is more relevant for the average than the pixel with value 3, both in view of its greater value (6>3), and in view of its proximity to the mass center (7).

By calculating a dot diameter for the stacked frame, it is possible to obtain an average diameter of the dots for each ink and for each power level.

Instead of the diameter, it is also possible to measure another geometrical value, such as a dot area (e.g., formed by counting pixels which in the stacked frame 1010 have a value greater than a threshold).

It is also possible to convert the geometrical magnitudes from non-dimensional values (e.g., expressed in pixels) into dimensional magnitudes (e.g., expressed in micrometers).

The method 800 may be repeated for each laser value and for each ink (e.g., colorant). For example, with reference to FIG. 6, thirty-five, i.e., five times seven, instances of method 800 may be executed, as consequence of the five levels of laser power and the seven inks used for generating the print session image 600.

Once the geometrical sizes (e.g. dot diameters) are calculated, calibration data or verification or print quality data may be obtained.

Calibration data may be obtained at block 706 from measurements performed at block 808, for example, by using statistical methods, such as a regression analysis, e.g., a linear regression analysis. A least squares method may be used, e.g., by determining a line which minimizes the sum of the squares of the errors made in the results of every single equation. For example, a Cartesian plane may be identified in which couples (x, y) are placed. The abscissa (x-axis) may be associated to laser power values. The ordinate (y-axis) may be associated to diameter values. By finding the line which best approximates all the couples (e.g., using the least squared method), calibration data may be retrieved. If, for example, the linear regression provides a line of type y=ax+b, coefficients a and b may be used as calibration data. For example, the calibrated data input to the laser unit 218 may be a reference value subtracted by b and successively scaled by a.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples may be implemented as a computer program product with a program instructions, the program instructions being operative for performing one of the methods when the computer program product runs on a computer. The program instructions may for example be stored on a machine readable carrier.

Other examples comprise the computer program for performing one of the methods described herein, stored on a machine readable carrier.

In other words, an example of method is, therefore, a computer program having program instructions for performing one of the methods described herein, when the computer program runs on a computer.

A further example of the methods is, therefore, a data carrier (or a digital storage medium, or a computer-readable medium) comprising, recorded thereon, the computer program for performing one of the methods described herein. The data carrier, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein.

The invention claimed is:

1. A method comprising:
   performing a print session in which a printer prints multiple patches on a substrate, the printer using different powers or different intensities for at least two different patches;
   performing an imaging session in which image data of the at least two different patches are acquired;

identifying printed elements on each of the at least two different patches;
performing a stacking operation on the at least two printed elements; and
determining calibration data for or print quality data of the printer on the basis of the image data of the at least two different patches.

2. The method of claim 1, wherein the multiple patches are printed in a non-iterative print session.

3. The method of claim 1, wherein identifying printed elements comprises identifying printed dots.

4. The method of claim 1, wherein determining comprises determining data associated the geometrical size of at least one printed element or a combination of printed elements or statistical or aggregate data associated to the geometrical size of printed elements.

5. The method of claim 1, further comprising measuring geometrical features of the printed elements.

6. The method of claim 1, further comprising determining an intensity value for at least one pixel of the image data.

7. The method of claim 3, further comprising determining a mass center of an area of pixels representing a dot.

8. The method of claim 1, wherein the printer is a laser printer, a print press, or a liquid toner electrophotographic printer, LEP.

9. The method of claim 8, wherein determining calibration data comprises determining data which modify a reference power value for a laser unit of the printer.

10. The method of claim 9, further comprising calibrating the printer by modifying the reference intensity value.

11. The method of claim 10, wherein modifying the reference value comprises modifying a pulse-width modulation, PWM, value.

12. The method of claim 1, further comprising, during the print session, repeating the print of at least one patch at the same power level with the same ink.

13. The method of claim 1, further comprising, during the print session, repeating the print of a patch at the same power level with different inks.

14. A device to:
calculate calibration data or print quality data by:
determining image data on printed elements of a plurality of patches printed at different intensities by a print device;
identifying printed elements on each of the plurality of patches; and
performing a stacking operation on the identified printed elements.

15. A non-transitory storage device containing executable instructions which, when executed by a processor, causes the processor to:
acquire an image containing two patches printed on a substrate at different power levels;
from the two patches, determine measurement data of printed elements or stacked printed elements or statistical or aggregate data of printed elements;
identify printed elements on each of the at least two different patches, wherein the printed elements include printed dots;
determine a mass center of an area of pixels representing the printed dots; and
determine calibration data for or print quality data of a print system.

* * * * *